US005581973A

United States Patent [19]
Underhill

[11] Patent Number: 5,581,973
[45] Date of Patent: Dec. 10, 1996

[54] APPARATUS FOR MAKING ROUND BALES

[75] Inventor: Kenneth R. Underhill, Strasburg, Pa.

[73] Assignee: New Holland North America, Inc., New Holland, Pa.

[21] Appl. No.: 537,019

[22] Filed: Oct. 2, 1995

[51] Int. Cl.$^6$ .............................. B65B 27/12; B65B 63/04
[52] U.S. Cl. ................................................ 53/118; 53/587
[58] Field of Search ........................ 56/341, 343; 53/587, 53/118, 556, 211, 215

[56] References Cited

U.S. PATENT DOCUMENTS

| | | | |
|---|---|---|---|
| 4,176,596 | 12/1979 | Sacht | 100/88 |
| 4,212,149 | 7/1980 | Krone et al. | 56/341 |
| 4,510,741 | 4/1985 | Campbell et al. | 56/341 |
| 4,580,398 | 4/1986 | Bruer et al. | 56/341 |
| 4,599,844 | 7/1986 | Clostermeyer et al. | 53/118 |
| 4,610,123 | 9/1986 | Krone et al. | 53/118 |
| 4,766,717 | 8/1988 | Thomann | 56/341 |
| 4,956,968 | 9/1990 | Underhill | 53/341 |
| 5,152,123 | 10/1992 | Viaud et al. | 53/587 X |
| 5,243,806 | 9/1993 | Jennings et al. | 53/118 |
| 5,247,775 | 9/1993 | Viaud | 53/118 X |
| 5,433,059 | 7/1995 | Kluver et al. | 53/118 X |

FOREIGN PATENT DOCUMENTS

| | | | |
|---|---|---|---|
| 3313883 | 10/1984 | Germany | 53/587 |

*Primary Examiner*—Linda Johnson
*Attorney, Agent, or Firm*—Frank A. Seemar; Larry W. Miller

[57] ABSTRACT

A round baler having a main frame including opposing sidewalls, and an apron assembly comprising crop engaging elements disposed between said sidewalls for defining a bale forming chamber having a fixed generally cylindrical shape with a transverse inlet. The crop engaging elements move along a path having an inner course contiguous with a major portion of the fixed periphery of the cylindrical chamber, and a pickup assembly for feeding crop material to the chamber through the inlet whereby crop material accumulated in the chamber is engaged by the crop engaging elements and formed into a compacted cylindrical package under conditions where a sufficient amount of crop material has accumulated in the chamber. A supply of net material is dispensed via a dispensing assembly having grasping elements for feeding the net into the chamber for wrapping the periphery of the cylindrical package of crop material in the chamber to form a round bale of crop material. The dispensing assembly is mounted on the main frame to pivot about a fixed pivot for moving the grasping elements between a retracted position remote from the cylindrical chamber and an extended position adjacent the cylindrical chamber for dispensing net between the peripheral surface of the compacted cylindrical package of crop material and the crop engaging elements.

9 Claims, 5 Drawing Sheets

APPARATUS FOR MAKING ROUND BALES

FIELD OF THE INVENTION

This invention relates generally to apparatus for making cylindrical bales of crop material, commonly referred to as a round baler. More particularly, this invention pertains to a wrapping assembly for wrapping crop material that has been formed into a cylindrical package in a round baler having a fixed forming chamber.

BACKGROUND OF THE INVENTION

Prior art balers generally have a bale forming chamber defined by an apron comprising an array of side-by-side belts, transverse slats trained on chains, a plurality of rolls or a combination of these various elements, e.g., rolls and belts. Crop material, such as hay, is picked up from the ground as the baler traverses the field, fed into a fixed or variable chamber where it is accumulated and compressed to form a cylindrical package of crop material. The formed package, while in its compacted condition inside the chamber, is wrapped with net, plastic film, twine or the like, to produce a completed round bale that is then ejected from the chamber onto the ground for subsequent handling.

Exemplary of prior art round balers of the type referred to above having a fixed chamber, i.e., a bale forming chamber that does not vary in size, are the various balers disclosed in U.S. Pat. No. 4,176,596, issued Dec. 4,1979 in the name of Hans O. Sacht, No. 4,212,149, issued Jul. 15, 1980 in the name of Bernard Krone et al, and 4,599,844, issued Jul. 15, 1986 in the name of Gerhard Clostermeyer et al, each of which illustrates a different type of apron assembly. In U.S. Pat. No. 4,176,596 a baler is disclosed in which the bale forming chamber is defined by a plurality of similar groups of side-by-side conveyor belts arranged around the periphery of the chamber. The conveyor comprises a pair of opposing chains between which a plurality of parallel crop engaging slats are mounted. The chamber in U.S. Pat. No. 4,212,149 is defined by a continuous slatted conveyor in combinations with a pair of floor rolls, in which an inner run of the conveyor is guided along a fixed path along a major portion of the periphery of the chamber. A third type of apron assembly, shown in U.S. Pat. No. 4,599,844, consists of a plurality of adjacent rolls arranged transversely in a generally circular array to define a cylindrical chamber.

Various wrapping systems employ known wrapping materials, such as net or twine, to wrap compacted packages of crop material formed in fixed chamber round balers. For example, the Sacht and Krone et al patents, mentioned above, refer to commonly accepted twine wrapping systems for completing bales formed in the balers disclosed. In another patent directed to a fixed chamber defined by transverse slats mounted on chains, U.S. Pat. No. 4,610,123, issued Sep. 9, 1986 in the name of Bernard Krone et al, a system is disclosed whereby net wrapping material is used. In this baler the net is introduced into the fixed chamber via the transverse inlet through which crop material is fed.

In the baler disclosed in the Clostermeyer et al patent, mentioned above, net wrapping is accomplished by introducing net into the forming chamber via a path between a pair of adjacent rolls in the circular array defining the chamber. Another example of this is illustrated in U.S. Pat. No. 4,580,398, issued Apr. 8, 1996 in the name of Dirk Bruer et al.

Although twine wrapped bales are common and readily acceptable, many farmers prefer to use net for various reasons, e.g., less losses in certain crop conditions, a smoother outer surface on the completed bale which gives added protection against rain, and reduced field time for wrapping due to the reduced number of revolutions of the completed package in comparison to twine wrapping. Regardless of the wrapping medium, in a fixed chamber baler, as in most variable chamber balers, initiation of the wrapping step is not commenced until a cylindrical package of crop material has been fully formed and compacted in the chamber at which time the tail of the twine or net is introduced to the chamber between the forming elements of the apron or through the crop inlet. The twine or net is retained between the outer surface of the compacted cylindrical package of crop material and the apron, and due to frictional force the wrapping material encases or encircles the package as it continues to rotate in the chamber. Finally, the wrapping process is completed, the net or twine is severed, and a completed bale is discharged from the chamber.

In the past, problems have been encountered in attempts to consistently introduce wrapping material to the chamber. Especially in the case of net where a tail of material the width of the package is desirably introduced simultaneously and evenly across the entire width of the forming chamber for efficient and effective wrapping. As mentioned above one of the principal advantages of net wrapping is the ability to reduce wrapping time. This is accomplished by limiting the number of revolutions of the completed package in the chamber during wrapping to 2 or 3 which is a significant contribution to reduction of the overall elapsed time in the bale forming process as compared to twine where ten times that number would not be uncommon, depending on crop material and bale size. However, a key to successfully achieving this important advantage is feeding an even tail into the chamber in a consistent and uniform fashion, and severing the net in a manner that enables subsequent wrapping to be initiated effectively.

SUMMARY OF THE INVENTION

An important object of the present invention is to provide wrapping apparatus for a fixed chamber round baler that consistently introduces a web of wrapping material to the chamber in a manner that enhances reliability and thereby improves overall performance.

In pursuance of this and other important objects the present invention provides for new and unique improvements to a round baler for forming crop material into cylindrical bales, comprising opposing sidewalls, means defining a bale forming chamber having a fixed generally cylindrical shape with a transverse inlet, the defining means including an apron assembly comprising crop engaging means disposed between the sidewalls, means for supporting the apron assembly on the main frame, means for moving the crop engaging means along a path contiguous with a portion of the fixed periphery of the cylindrical chamber, means for feeding crop material to the chamber through the inlet whereby the crop material accumulated in the chamber is engaged by the crop engaging means under conditions where the crop material engaging means are moving along a portion of the periphery to engage the crop material and form it into a compacted cylindrical package when a sufficient amount of crop material has accumulated in the chamber, and a supply of web material. More particularly, the invention contemplates a dispensing assembly including insertion means for dispensing the web material into the chamber for wrapping the periphery of the cylindrical package of crop material to form a round bale of crop material, the insertion means including grasping means for transversely engaging the web material, and means for mounting the dispensing assembly on the main frame to pivot about a fixed pivot for moving the grasping means of the insertion means between a retracted position remote from the cylindrical chamber and an extended position adjacent the cylindrical chamber for dispensing the web material between the peripheral surface of the compacted cylindrical package of crop material and the crop engaging means.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
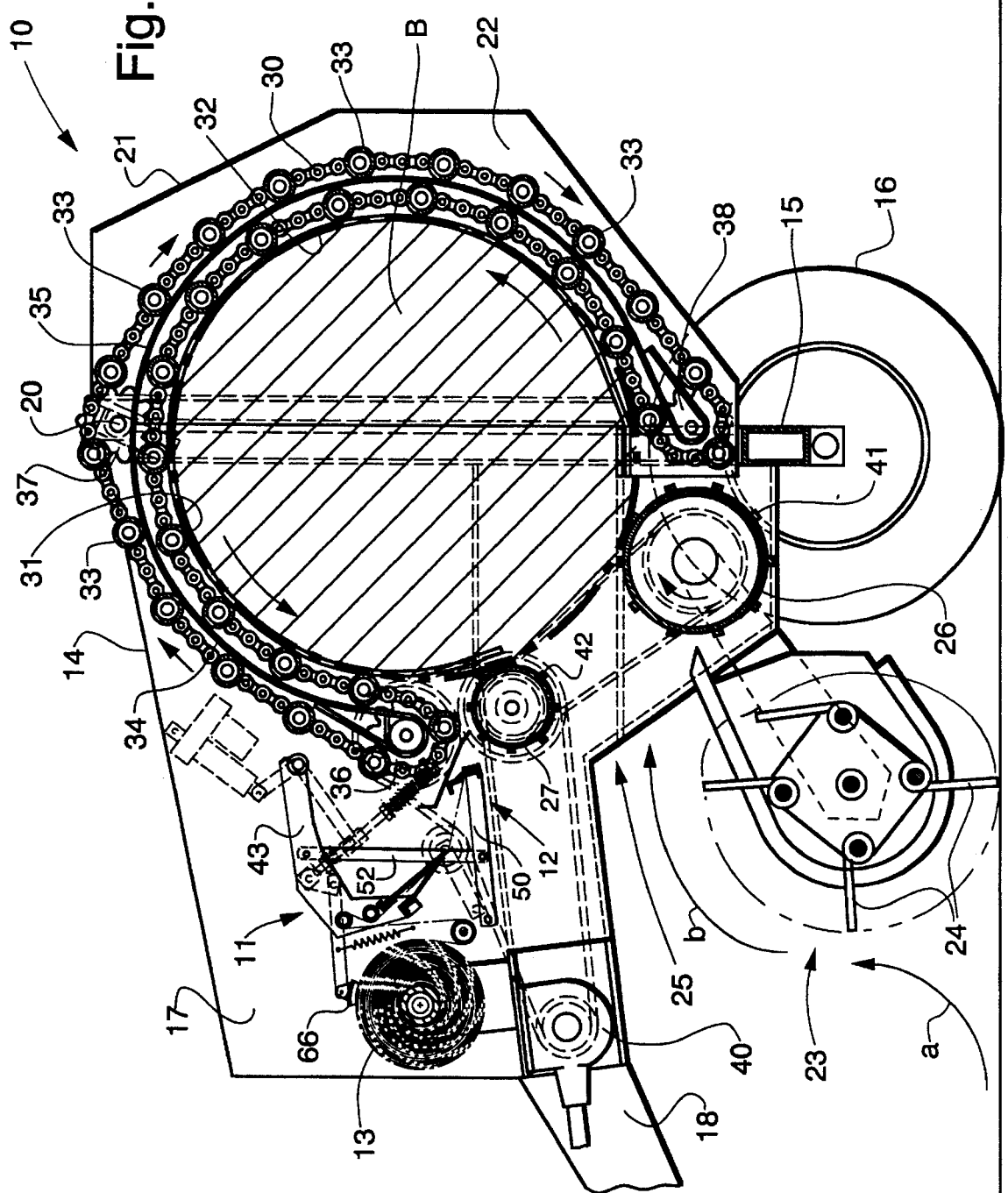
FIG. 1 is a cutaway side elevational view of a round baler in which the present invention is embodied.

Referring now to the drawings for a more detailed description of the preferred embodiment of the invention, FIG. 1 shows a fixed chamber round baler 10 of the type disclosed in U.S. Pat. No. 4,212,149, discussed above. As will become apparent from the following description, the present invention is directed to improved apparatus for wrapping a cylindrical package of crop material formed in a fixed chamber type round baler, a typical example of which is baler 10. More particularly, the wrapping apparatus generally comprises a dispensing assembly 11 and a net severing assembly 12 for dispensing and cutting web material, such as net, issued from a supply roll 13.

Round baler 10 includes a main frame 14 with a main support beam 15 on which a pair of wheels 16 (only one shown) are rotatably affixed. The main frame includes a pair of side walls between which a cylindrical bale forming chamber extends. For the purposes of clarity only one wall 17 is shown throughout the drawings and the elements mounted inwardly thereof are shown in full lines for clarity, which is an approach not uncommon in the descriptions in prior art patents. For illustrative purposes reference letter B is used to designate a bale, shown in cross section in the chamber.

Baler 10 also includes a tongue 18 extending from the forward portion of main frame 14 for conventional connection to a tractor. Pivotally connected to the sidewalls of main frame 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pickup assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

The bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates during bale discharge. The apron further comprise a plurality of parallel tubular crop engaging slats 33 extend between chains 30 to provide a cage-like periphery of the cylindrically shaped chamber. Radially outwardly of the inner run of apron assembly 28 are front and rear sections 34, 35 of continuous cylindrical bale chamber wall. These sections, also separable during bale discharge are mounted between side walls 17 and tailgate walls 22 for maintaining integrity between the outer and inner runs of chain 30. Operatively engaged with chain 30 are drive sprocket 26 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a clockwise direction by conventional drive means appropriately coupled to gear box 40. These rolls are provided with ribs 41, 42 to enhance their ability to convey crops in the chamber as a bale is being formed. Other forms of aggressive surface structure may be used to accommodate various types of crops and conditions.

Figure 2:
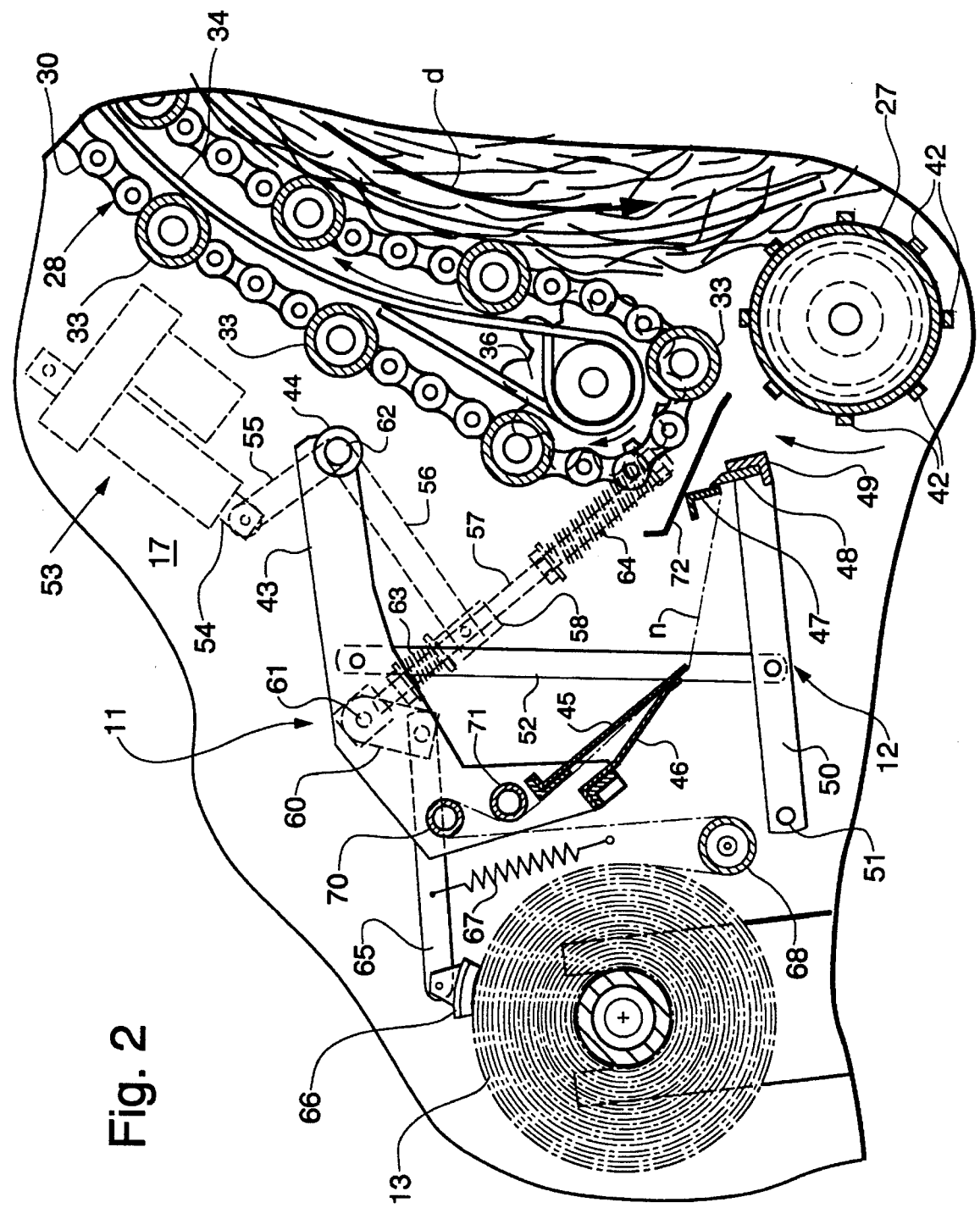
FIG. 2 is another cutaway side elevational view and shows in enlarged form the wrapping apparatus portion of the round baler of FIG. 1.

Now turning to FIG. 2 for a more detailed description of the wrapping apparatus of the present invention which comprises dispensing assembly 11 shown in the fully retracted position, and net severing assembly 12, which assemblies are cooperatively adapted to dispense net n from net supply roll 13 and severe such net, respectively.

Dispensing assembly 11 comprises a pair of parallel frame members 43 fixedly secured to rotatably supported cross tube 44 that extends between sidewalls 17, and upper and lower clamping members 45, 46, respectively, both of which have tips for grasping net n in a fashion that is clearly described in U.S. Pat. No. 4,956,968, issued Sep. 18, 1990 in the name of Kenneth R. Underhill, hereby incorporated by reference.

Net severing assembly comprises a shear bar 47 fixedly mounted between sidewalls 17, and a transverse knife 48 affixed to a mounting member 49 extending between a pair of parallel knife support arms 50 rotatably mounted at fixed pivots 51 on the inside surface of sidewalls 17. A coupling link 52 is pivotally attached at one end to dispensing assembly frame member 43, and at its other end to knife support arm 50.

Mounted outboard of sidewall 17 is an electrical actuator assembly 53 comprising means for reciprocally driving element 54, which is pivotally attached to one end of a link 55. It should be noted that the function of actuator assembly 53 could be accomplished equally as well with a hydraulic cylinder or other equivalent mechanisms. The other end of link 55 is fixedly attached to cross tube 44. Also fixedly attached to cross tube 44 is a link 56 which is coupled to rod 57 via a sliding yoke 58. Rod 57 has a freely swingable lower end that moves in response to the position of link 56 which determines the position of yoke 58 along its shank. Thus the upper end of rod 57, which is affixed to a leg 60, pivots about its pivot 61 in response to the swing of lever 56 about pivot 62. Cushioning springs 63, 64 absorb the impact of yoke 58 during its traversal along rod 57.

Affixed to and pivoting with leg 60 is drag arm 65, to the outer end of which is attached drag shoe 66 held in contact with the outer surface of net supply roll 13 by spring 67. In a manner similar to that which is taught by U.S. Pat. No. 5,243,806, issued Sep. 14, 1993 in the name Richard E. Jennings et al, hereby incorporated by reference, the net is issued from supply roll 13 along a path around idler roll 68 and spreader rolls 71, 70 and thence to clamping members 45, 46.

Figure 3:
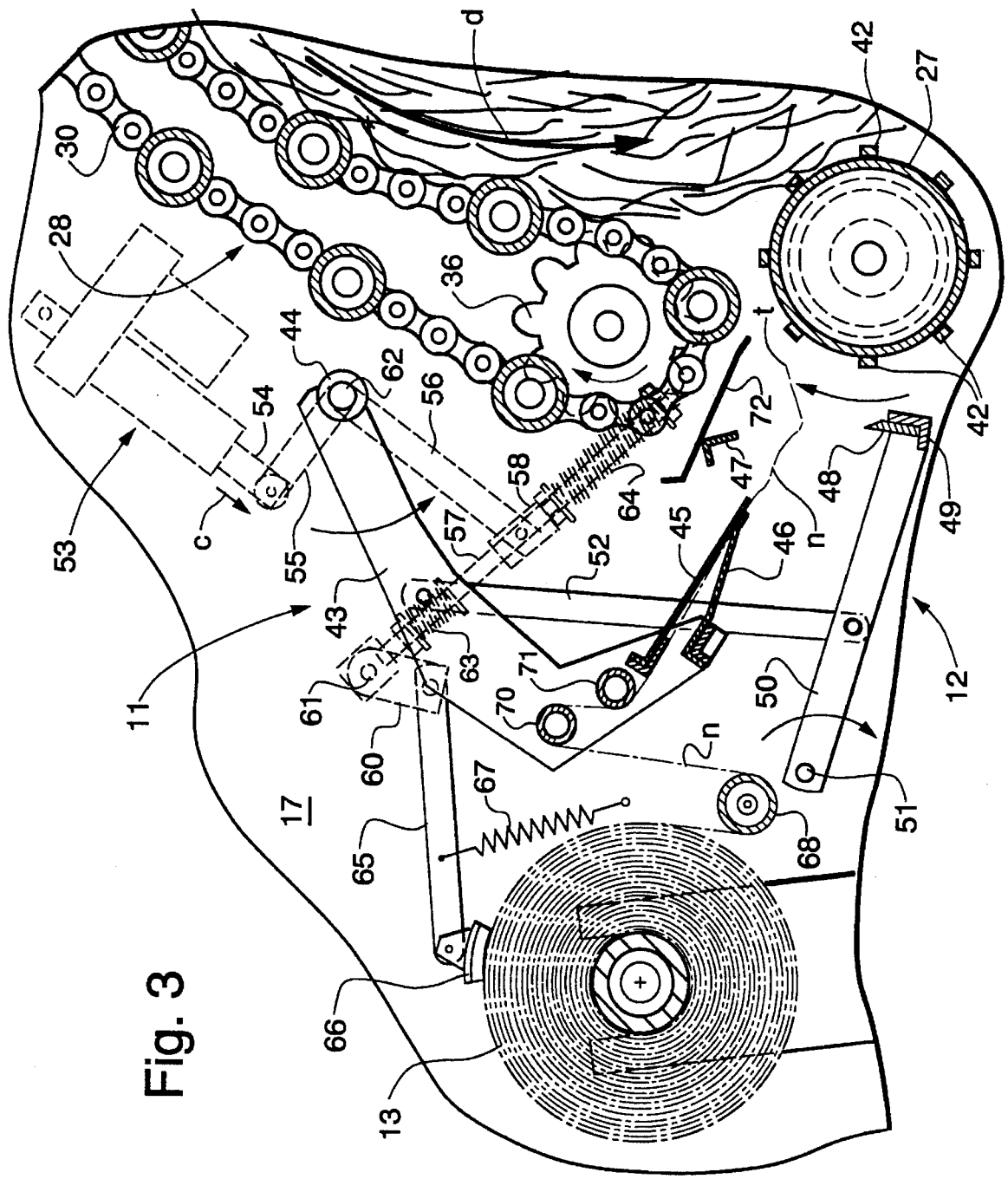
FIGS. 3–5 are side elevational views similar to FIG. 2 in which the wrapping apparatus of the present invention is shown in selected conditions during operation.

In operation net dispensing assembly 11 moves from the fully retracted position shown in FIGS. 1 and 2 to its intermediate position shown in FIG. 3. This is achieved when actuator element 54 is thrust outwardly, as indicated by direction arrow c, which rotates frame members 43 counter clockwise, causing net severing assembly to rotate clockwise and release the end of the net from between knife 48 and shearbar 47 where it was being held during the formation of a compacted cylindrical package in the chamber. Net tail t is guided toward the insertion space between roll 27 and 1 shield element 72 as the compacted package of crop material rotates in the chamber in direction d past such space. Element 72 comprises a rigid sheet of material extending between sidewalls 17 to shield apron 28 which is moving away from the chamber. The passage of ribs 42 on roll 27 past the opening between roll 27 and shield 72 creates air currents that tends to pull tail t toward the chamber which causes a fluttering effect in the net illustrated by the generally extended position of the limp end of the net n depicted in FIG. 3. This enhances the initiation of net wrapping.

Figure 4:
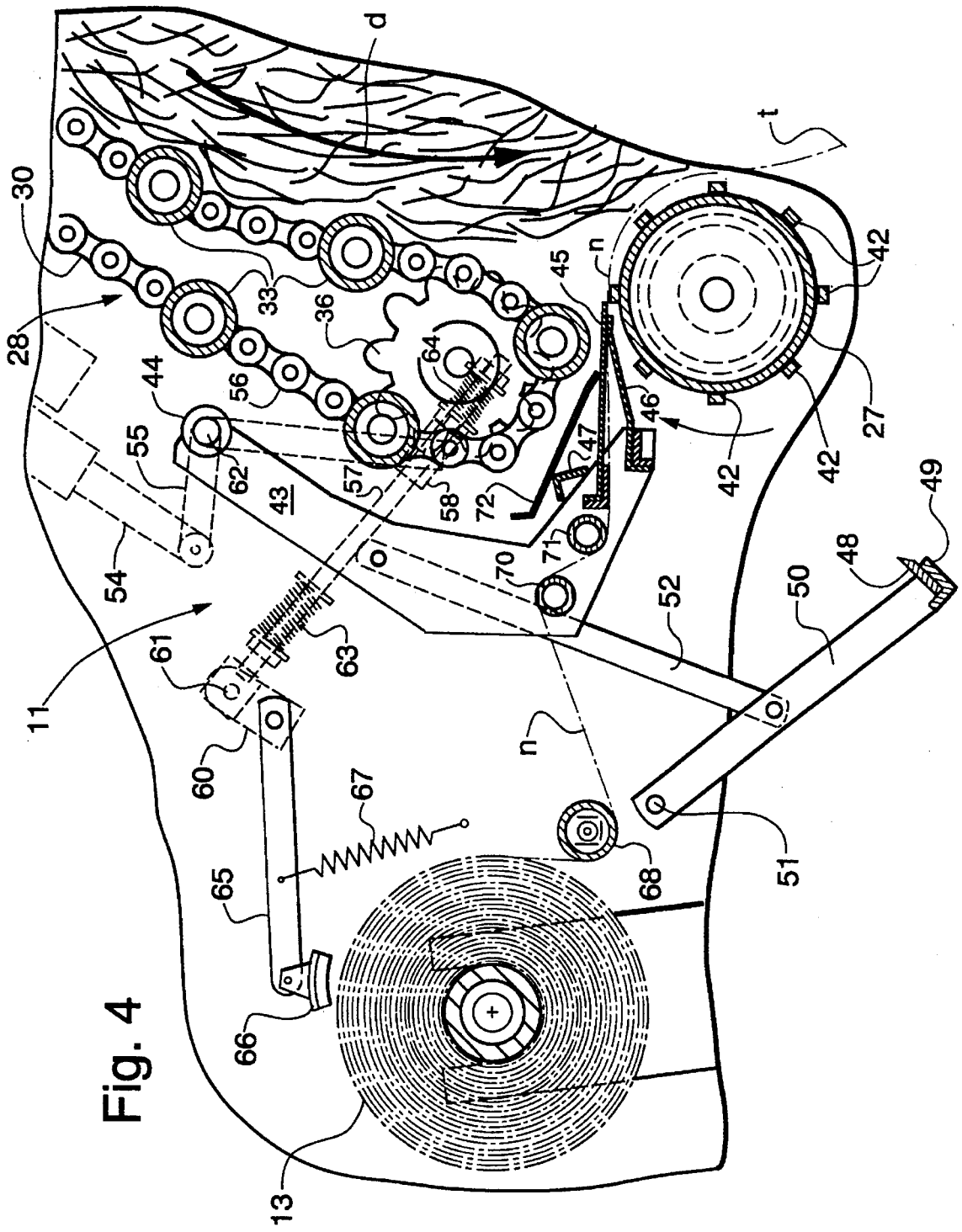

FIG. 4 shows the dispensing assembly in the fully extended position during wrapping. Drag shoe 66 has been released to allow net to be freely issued, i.e., shoe is not in contact with the surface of net supply roll 13. In the event some drag is desirable during wrapping this shoe can be adjusted for varying frictional engagement. When the tail engages the surface of the cylindrical package it is pulled to the nip formed by the roll and the rotating package and thence dragged around periphery to envelope the cylindrical package of crop material in a known manner. Even without the flutter phenomena, tail t of net n is positively inserted to the vicinity of the nip mentioned above under conditions where the dispensing assembly reaches its fully extended position shown in FIG. 4 to start the wrapping sequence, i.e., net is pulled from the supply roll and dispensed to the chamber.

Figure 5:
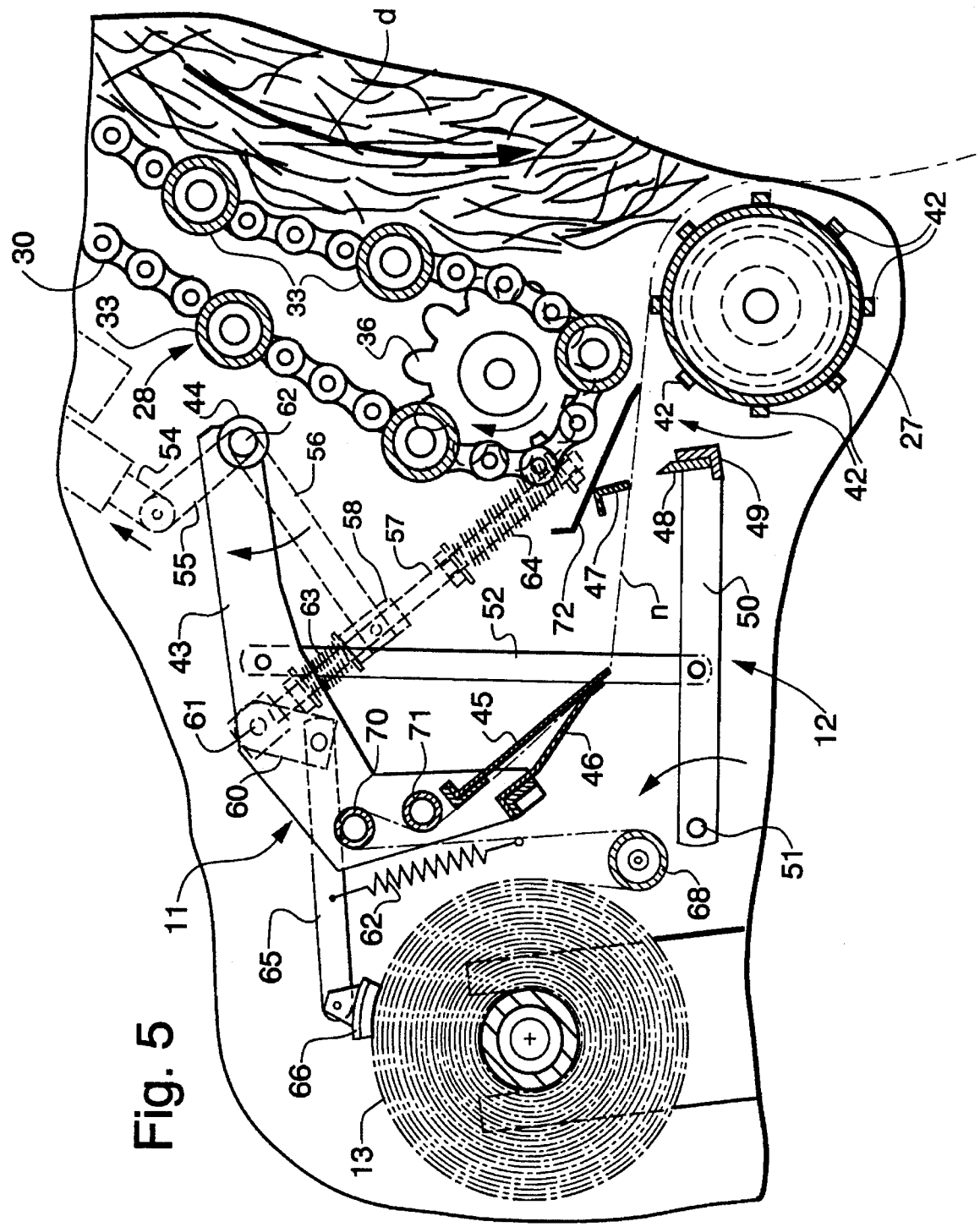

After 2 or 3 wraps (or more, if desired) have been applied in this fashion, dispensing assembly 11 is withdrawn via an intermediate position (FIG. 5) by retraction of actuator element 54 causing frame members to rotate clockwise which in turn pulls severing assembly upwardly toward net n being dispensed along a path adjacent to shearbar 47. When the fully retracted position of FIGS. 1 and 2 is attained net n is severed by knife 48 which holds the end of the net tail t against shear bar 47 until the next wrapping operation is initiated.

In summary, included among the many advantages, explicit and implicit, of the unique apparatus described herein is the provision of a fixed chamber round baler with overall enhanced operation due to the incorporation of wrapping apparatus comprising a dispensing assembly and a severing assembly that cooperate in a manner to provide reliable net insertion with minimal time requirements.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A round baler for forming crop material into cylindrical bales, said baler having a main frame including opposing sidewalls, means defining a bale forming chamber having a fixed generally cylindrical shape with a transverse inlet, said defining means including an apron assembly comprising crop engaging means disposed between said sidewalls, means for supporting said apron assembly on said main frame, means for moving said crop engaging means along a path contiguous with a portion of the fixed periphery of said cylindrical chamber, means for feeding crop material to said chamber through said inlet whereby said crop material accumulated in said chamber is engaged by said crop engaging means under conditions where said crop material engaging means are moving along a portion of said periphery to engage said crop material and form it into a compacted cylindrical package, whereupon it is rotated by said crop engaging means when a sufficient amount of crop material has accumulated in said chamber, and a supply of web material having a free end, the improvement comprising a dispensing assembly including insertion means for dispensing said web material into said chamber for wrapping the periphery of said cylindrical package of crop material to form a round bale of crop material, said insertion means including grasping means having a pair of opposing tips for transversely engaging said free end of said web material, and means for mounting said dispensing assembly on said main frame to pivot said insertion means about a fixed pivot for moving said pair of opposing tips of said grasping means between a retracted position remote from said cylindrical chamber and an extended position adjacent said cylindrical chamber for depositing said free end of said web material between the peripheral surface of said compacted cylindrical package of crop material and said crop engaging means, whereby said web material is dispensed about the peripheral surface of said compacted cylindrical package under conditions where said package is rotated in said chamber.

2. A round baler as set forth in claim 1 wherein said improvement further comprises severing means including cutting means for severing said web material after a predetermined amount has been dispensed about the peripheral surface of said compacted cylindrical package of crop material under conditions where said package is rotated in said chamber.

3. A round baler as set forth in claim 2 wherein said improvement further comprises means for mounting said severing means on said main frame to pivot about a fixed pivot for moving said cutting means into said web material under conditions where said dispensing assembly has moved said insertion means to said retracted position and said web material continues to be dispensed from said insertion means along an intermediate path to said chamber as said package is rotated in said chamber.

4. A round baler as set forth in claim 3 wherein said cutting means comprise a transverse knife edge disposed on one side of said intermediate path of said web material under conditions where said insertion means is in said retracted position, and a shear bar mounted on the other side of said intermediate path of said web material, said shear bar including a shearing edge disposed to cooperate with said knife edge when said cutting means is moved into said web material.

5. A round baler as set forth in claim 3 and further comprising coupling means between said dispensing assembly and said severing means including a pivotally attached link for preventing said cutting means from moving into said web material under conditions where said insertion means is in said extended position.

6. A round baler as set forth in claim 1 wherein said supply of web material comprises a tube and a continuous sheet of net coiled on said tube with said free end issuing from the outer surface thereof, and wherein drag means operatively associated with said supply are provided to vary the force necessary to dispense said net from said tube.

7. A round baler as set forth in claim 6 and further comprising linkage means between said drag means and said dispensing assembly for activating said drag means under conditions where said grasping means is in said retracted position.

8. A round baler as set forth in claim 1 wherein said crop engaging means comprise a plurality of transverse slats and a roll having an aggressive outer surface, said apron assembly further comprises a pair of opposed mounting chains between which said slats extend in an equidistant adjacent manner, means on said sidewall for mounting said chains for traversal along opposing continuous loops whereby said slats travel along said path, and means for mounting said roll on said main frame adjacent said continuous loops of said chains such that said aggressive surface of said roll is generally tangent with said fixed periphery of said cylindrical chamber, and said mounting means for said dispensing assembly moves said pair of opposing tips of said grasping means to deposit the free end of said web between said roll and said path for initiating the dispensing of said web material.

9. A round baler as set forth in claim 8 wherein said crop engaging means further comprise a floor roll having an aggressive outer surface, and said apron further comprises means for mounting said floor roll on said main frame adjacent said continuous loops of said chains such that said aggressive surface of said floor roll is generally tangent with said fixed periphery of said cylindrical chamber, said roll and said floor roll defining said transverse inlet.

* * * * *